United States Patent [19]
Gardziella

[11] 3,853,665
[45] Dec. 10, 1974

[54] METHOD OF BONDING USING POLYESTER-WAX FUSION ADHESIVES

[75] Inventor: Arno Gardziella, Witten-Rudinghausen, Germany

[73] Assignee: Dynamit Nobel AG, Troisdorf bez. Cologne, Germany

[22] Filed: Mar. 7, 1972

[21] Appl. No.: 232,511

[30] Foreign Application Priority Data
Mar. 18, 1971  Germany............................ 2113207

[52] U.S. Cl. ................ 156/332, 12/142 F, 36/19.5, 117/122 H, 161/231, 161/234, 260/28
[51] Int. Cl. .......................... C09j 5/00, B32b 31/00
[58] Field of Search ............ 156/327, 332; 161/234, 161/231; 260/28; 12/142 F; 36/19.5; 117/122 H, 122 PA

[56] References Cited
UNITED STATES PATENTS
| | | | |
|---|---|---|---|
| 3,515,628 | 6/1970 | Jackson et al. | 161/184 |
| 3,619,392 | 11/1971 | Metzner et al. | 204/159.15 |
| 3,644,245 | 2/1972 | Flanagan et al. | 260/23 |
| 3,726,817 | 4/1973 | Niswonger | 260/9 |
| 3,728,212 | 4/1973 | Caldwell et al. | 161/182 |
| 3,755,526 | 8/1973 | Watanabe | 264/178 F |

*Primary Examiner*—Charles E. Van Horn
*Assistant Examiner*—Robert A. Dawson
*Attorney, Agent, or Firm*—Burgess, Dinklage & Sprung

[57] ABSTRACT

A fusion adhesive composition comprising a polyester and a wax, said wax present in said composition in an amount between 0.01 and 5 weight percent, based on the weight of the total composition; a method for preparing such a fusion adhesive composition and a method for adhering substances together utilizing a fusion adhesive composition.

16 Claims, No Drawings

METHOD OF BONDING USING POLYESTER-WAX FUSION ADHESIVES

BACKGROUND OF THE INVENTION

1. Field of the Invention

This invention is directed to a fusion adhesive composition containing a polyester and more particularly to an improved polyester fusion adhesive composition containing a minor amount of wax, which fusion adhesive composition is improved with respect to the setting time required therefor. This invention is further directed to a method of preparing such a polyester base fusion adhesive composition and to a method for securing surfaces together utilizing the same. The invention is particularly directed to improved polyester fusion adhesive compositions which contain polyesters having a setting temperature or melting point above 70°C. and, particularly, between about 70° and 200°C. Such polyester fusion adhesive compositions have desirable mechanical properties and, in accordance with the present invention, a markedly reduced setting time. Such polyester fusion adhesives are useful in numerous applications, particularly in the formation of shoes in the process known as "toe nipping" wherein the toe and last of the shoe are secured together.

2. Discussion of Prior Art

Thermoplastic adhesives are used for the cementing of materials, such as paper, leather, wood, plastics, etc. The adhesives, which contain no solvents, are applied in the melted state. Such thermoplastic adhesives are referred to as "fusion adhesives."

Fusion adhesives often have the great disadvantage that the setting time is too long. The term "setting time," as used herein, refers to the period of time required from the application of the cement to the permanent adhesion of the materials to be joined together. The setting time is also referred to, appropriately, as the "open time." Rapid setting is especially important and desirable in the manufacture of shoes. In the manufacture of a shoe, a number of operations are necessary. The overall process of shoe manufacture includes the so-called toe nipping of shoes, which is performed in a fully automatic manner on toe nipping machines using thermoplastic adhesives also known as fusion adhesives.

In order to achieve a production cycle that, considered by the large, will be a rapid one, it is necessary that the time involved in the individual process, namely the toe nipping, be kept to a minimum. For the full utilization of the output capacity of toe nipping machines, fusion adhesives are required which are capable of sufficiently rapid setting. Fast-setting fusion adhesives are desired not only in the manufacture of shoes for the cementing of leather, but also in other manufacturing areas, e.g., in packaging for the gluing of paper, or in the furniture industry for the gluing of veneer edging. It has been found that in all cases the factor that determines the amount of time required for production is the setting time of the thermoplastic adhesives.

Polyamides, copolymers having an ethylene, vinyl acetate, acrylate and other monomeric base, and polyesters, have been used as fusion adhesives. Appropriate polyesters for this purpose are considered to be those of terephthalic acid monomeric base, or, optionally prepared from a monomer comprising isophthalic acid, aliphatic dicarboxylic acids, all of which can have 2 to 10 carbon atoms, and glycols with 2 to 10 carbon atoms. Most fusion adhesives comprising a copolyester set at temperatures above 70°C. Their open time amounts to from about 2 to 20 seconds. Otherwise, they set appreciably more slowly, in which case the open time amounts to more than 20 seconds.

It is also known that the setting time of copolyesters which, as described above, set at temperatures above 70°C. and have an open time of less than 20 seconds can be further reduced by the addition of finely dispersed, inert, inorganic powders with a grain size of less than 5 microns. Inorganic powders which are especially suitable in this regard consist, for example, of silicic acid, titanium dioxide, zirconium oxide, aluminum oxide, talcum, gypsum, fluorspar, kaolin, mica, barium sulfate, calcium carbonate, bentonite or the like.

Such a powder additive, however, is not capable of effectively shortening the open time of those copolyester fusion adhesives which, by themselves, require a relatively long open time, i.e., more than 20 seconds, in order to set at a temperature above 70°C. Since polyester fusion adhesives such as these, however, generally have very desirable mechanical characteristics, there has been a definite need in the art to substantially reduce the open time of these special fusion adhesives having melting points of about 70° to 200° C.

It is also known to add natural and synthetic waxes as extenders, especially to fusion adhesives of a polymer base. For this purpose quantities of 8 to 40 percent by weight are required in order to achieve a perceptible effect. Extending fusion adhesives comprising, as a major component, a polyester in this manner is not possible, since such polyesters are not sufficiently compatible with such waxes.

SUMMARY OF THE INVENTION

Broadly, this invention contemplates a fusion adhesive composition comprising a polyester and a wax, said wax present in said fusion adhesive composition in an amount between 0.01 and 5 percent, by weight based on the weight of the composition.

In a particularly desirable embodiment this invention contemplates a polyester fusion adhesive comprising a polyester having a melting point between 70° and 200°C. and a wax present in an amount between 0.01 and 5 percent, by weight, based on the weight of the polyester fusion adhesive composition.

The present invention involves the finding that a wax, previously believed to be useless in a polyester base fusion adhesive, provides remarkable shortening of the setting time of polyester base fusion adhesives. In the present invention, there are two necessary components of the fusion adhesive. The fusion adhesive contains a polyester, desirably one obtained from at least one monomeric compound of the three isomeric phthalic acids or esters, i.e., isophthalic acid, terephthalic acid, or an isomer thereof. The polyester component can be a simple polyester, such as one obtained by a simple polymerization of monomeric constituents. Copolyesters are similarly contemplated wherein the polymer comprises a plurality of copolymerized polyester forming monomers in polymeric form. Additionally, the polyester of the copolymer can be copolymerized with another substance which is not a polyester. Particularly contemplated are copolymers of the polyester and other polymeric materials useful in fusion adhesives, notably, polyamides and copolymers having an ethylene, vinyl acetate, acrylate or other monomeric origin, and the like. It is preferred, however, that the copolymer be a co-polyester, because the wax substance has an appreciable effect on such copolyester in reducing the setting time of the fusion adhesive.

The wax ingredient of the fusion adhesive composition is desirably one or more of those specified below. Particularly contemplated waxes include synthetic oxide waxes made from the Fischer-Tropsch process, microwaxes obtained by extraction of paraffinic wax materials from petroleum or petroleum stocks, oxide waxes from soft petroleum and oxide waxes comprising an amount of a microwax obtained from the dewaxing of the petroleum stock. Particularly contemplated waxes are set forth below wherein the desirable melting points, acid numbers and saponification numbers of the types of waxes are specified. The fusion adhesive composition of the present invention is made by initially preparing the polyester or copolymer, e.g., copolyester, in generally known manner as by esterification of the acid followed by polycondensation of the resultant ester with, for instance, a dialcohol. The polyester is then intimately mixed with the wax or waxes to be used which are desirably present in an amount between 0.01 and 5 percent by weight. The mixing operation is desirably conducted under an atmosphere which is inert to the components at an elevated temperature above the melting point of the polyester component. Polyester and wax are preferably kneaded for a time sufficient to uniformly distribute the minor amount of wax through the polyester composition. Generally speaking, a temperature between 160° and 200°C. is adequate to carry out the intimate admixture of the wax with the polyester. The time required will vary between 5 and 30 minutes. It will be realized that the temperature and time will be dependent upon the specific nature of the polyester, and it will also be realized that higher temperatures require a shorter period for the mixing operation.

The use of the fusion adhesive compositions of the present invention is quite simple. Generally, the fusion adhesive is heated until it reaches its melting point. When it has reached its melting point, it is applied to one to the surfaces to be secured, and the other surface is then pressed firmly against the first surface, whereby the fusion adhesive is disposed between the surfaces to be secured. The surfaces are held in position until the open time or setting time has elapsed. When the polyester-wax fusion adhesive composition has set, the surfaces are secured together firmly. The time required for the setting operation depends upon the specific polyester employed, the wax employed, the amount of wax and the presence of other agents such as silicic acid, zirconium oxide, kaolin, mica, and other inorganic salts or oxides.

DISCUSSION OF PREFERRED EMBODIMENTS

Surprisingly, it has now been found that the open time of polyester-base fusion adhesives can be shortened simply by adding small quantities of the same waxes thereto. The subject of the invention is thus the use of at least one wax as a means of shortening the open time of polyester-containing fusion adhesives, the concentration of the wax in the fusion adhesive amounting to about 0.01 to about 5 percent, preferably 0.5 to 2.0 percent, of the weight of the total composition. The use of a wax according to the invention, however, is not limited to the modification of a co-polyester fusion adhesive having a melting point between 70° and 200°C., which by itself has an open time of more than 20 seconds. All other known polyester fusion adhesives with melting points of 70° to 200°C. which set in less than 20 seconds, can be modified in accordance with the invention, i.e., can be improved with respect to a decrease in setting speed or open time.

According to the invention, four types of waxes are preferably used. They are as follows:

1. Synthetic oxide waxes made by the Fischer-Tropsch process, having a melting point of about 50° to 150°C., preferably 50° to 100°C., with an acid number of about 30 to about 80 and a saponification number of about 90 to about 130.

2. Microwaxes from the deparaffination or dewaxing of petroleum, having a melting point of about 80° to 110°C., preferably 90° to 150°C., with an acid number of about 10 to 20 and a saponification number of about 20 to about 45.

3. Oxide waxes comprising an amount of microwax from the deparaffination or dewaxing of petroleum stock (see 2 above) having a melting point of about 80° to about 120°C., preferably 85° to 105°C., with an acid number of about 10 to 20 and a saponification number of about 20 to 70.

4. Oxide waxes comprising an amount of soft petrolatum, the wax having a melting point of about 40° to about 70°C., preferably 50° to 60°C., with an acid number of about 50 to 60 and a saponification number of about 100 to about 115.

By "oxide waxes," as used herein, is meant those waxes which have been subjected to oxidation, as by contact with air in dispersion, solution or in fused state, preferably in the presence of a catalyst, and at elevated temperature in some cases. Manganese soaps, nickel soaps or cobalt soaps are often used as catalysts in these oxidation processes.

When using a wax in conjunction with a polyester or copolyester, pursuant to the invention, to reduce open time, it is particularly desirable to have, as at least one monomer from which the polyester or co-polyester is derived, one or more of the three isomeric phthalic acids or esters. In some cases, it is desirable that such polyester contain one or more aliphatic dicarboxylic acids having a total of 6 to 36 carbon atoms. Copolyesters of this kind, which can be modified, according to the invention, can contain the following substances as glycols, for example: ethylene glycol, diethylene glycol, propylene glycol, butylene glycol, pentanediols and hexanediols in significant amounts.

The use of waxes in accordance with the invention as a means for shortening the open time of polyester fusion adhesives is described in the following examples. The polyesters, modified according to the invention, are also compared with fusion adhesives containing finely divided, well dispersed inorganic powders.

EXAMPLES

A. Preparation of Fusion Adhesives A to G

The copolyesters A to E were prepared in a conventional manner by the re-esterification and subsequent polycondensation of the esters and dialcohols listed in Table 1, in the stated quantities, with the addition of 5 grams of zinc acetate dihydrate, 10 grams of tetra-m-butyltitanate and 10 grams of triphenylphosphite. The reaction was performed in a stainless steel autoclave equipped with a stirrer and a fractionating column. The addition of triphenylphosphite was not performed until after the transesterification.

The procedure used was approximately the following: after repeated scavenging with nitrogen, methanol was removed by distillation at normal pressure at an internal temperature of 150° to 220°C. Thereafter, sebacic acid was added. To transesterify the sebacic acid, the temperature was increased to 250°C. and maintained at this level for about 2 hours. The completeness of the transesterification was tested by measuring the amount of reaction water that had passed over. After the triphenylphosphite had been injected with a little diol (to inhibit the transesterification catalyst) the reactor was evacuated and the internal temperature was then raised over a period of one hour to 270°C., and at the same time the pressure was reduced to less than 1 Torr. After three to four hours of stirring under these last-described conditions, the vacuum was broken by the introduction of nitrogen, and the content of the autoclave was taken out through a bottom valve and granulated. The products thus obtained had the viscosity values (reduced viscosity) and the melting points which are listed in Table 1. The "reduced viscosity" was defined in the customary manner set forth below. It was determined at 25°C. by means of a capillary viscosimeter and computed according to the following formula:

$$\eta\text{red} = (\eta - \eta_o/\eta_o) \cdot (1/c)$$

wherein: $\eta$ = viscosity of the solution $\eta_o$ = viscosity of the solvent (60 weight parts of phenol, 40 weight parts of 1,1,2,2-tetrachlorethane)

$c$ = concentration of the solution (here 1 g/100 ml of solvent)

The melting point was determined by differential thermoanalysis, the temperature of the melting maximum being given as the melting point.

The preparation of polyester fusion adhesive F was performed by the procedure described above, except that the following substances were added in the specified quantities:

9.7 kg dimethylterephthalate
3.65 kg adipic acid
7.1 kg 1,6-hexanediol
6.2 kg ethylene glycol
15 g zinc acetate dihydrate
25 g tetra-n-butyltitanate
30 g triphenylphosphite The polyester obtained, in which the molar ratio of terephthalic acid: adipic acid : 1,6-hexanediol : ethylene glycol was 10 : 5 : 6 : 9, had a reduced viscosity of 0.82 and a melting point of about 70°C. as measured by differential thermoanalysis.

Polyester fusion adhesive G was also prepared by the procedure described above, the following products being introduced in the reaction in the specified quantities:

6.2 kg dimethylterephthalate (DMT)
4.8 kg dimeric fatty acid (mol. wt. = 565)
5.2 kg ethylene glycol
1.7 kg diethylene glycol
3 g zinc acetate dihydrate
2 g antimony trioxide
10 g triphenylphosphite The antimony trioxide was used in place of the tetra-n-butyltitanate previously mentioned.

The polyester obtained, in which the molar ratio of terephthalic acid : dimeric fatty acid : ethylene glycol : diethylene glycol amounted to 16 : 4 : 17 : 3, had a reduced viscosity of 0.85 and a melting point of about 120°C.

B. Modification of Fusion Adhesives A to G by Addition of Wax to Reduce the Open Time The polyesters obtained in accordance with Section A above were mixed intimately in a vacuum kneader under nitrogen at a temperature of about 180°C. with 0.5 weight percent, 1.0 weight percent and 5.0 weight percent of an oxide wax X based on a synthetic wax obtained by the Fischer-Tropsch process. This oxide wax had a melting point of 53° to 55°Co., an acid number of 50 to 60 and a saponification number of 100 to 115. The modified fusion adhesives thus obtained were tested for open tme in the following manner.

C. Determination of Open Time

A film measuring 200 × 300 × 0.3 millimeters was prepared from the material to be tested. The film was laid on a glass plate and preheated in a drying oven to a temperature more than 40°C. above the melting point of the film. After 10 minutes, the glass plate was removed from the oven together with the adhesive film, and after 40 seconds, unweighted discs of leather or paper having a diameter of 3 centimeters were dropped on it from a height of 5 centimeters at 5-second intervals. This procedure was performed until the adhesive film had set. After 30 minutes of standing at room temperature, a determination was made, by the removal of the test discs, of the last point at which the adhesive coating was still tacky. The time thus determined was defined as the open time. The results of these tests are listed in Table 1.

In the balance of the experiments, the polyesters A to G were modified, by a procedure similar to that described above, with an oxide wax Y based on microwaxes from the deparaffination or dewaxing of petroleum. The waxes had melting points of 96° to 102°C., acid numbers of 10 to 15 and saponification numbers of 25 to 35.

The quantities added amounted again to 0.5 weight percent, 1.0 weight percent and 5.0 weight percent. The test for the "open time" was performed the same as described above.

D. Determination of the Open Time of Unmodified Fusion Adhesives and of Polyesters Modified by the Addition of Inert Powders as in the Prior Art.

The open time was determined in the same manner as described above in Section B for the plain polyesters (without additives of any kind).

This was followed by another 14 determinations in which the polyesters were modified in one case with 0.5 weight percent of a talcum powder (grain size smaller than 5 microns) and in another case with 0.5 percent by weight of silica gel (grain size under 5 microns). The values obtained are listed below.

In the table below, the properties of the polyesters are set forth together with the effect thereon of waxes at varying concentrations. The table also shows the effect of talcum powder and silicon gel on open time.

The experimental findings shown that, by the procedure of the present invention, an optimum shortening of the open time is obtained. The process of the invention is also definitely superior to prior art methods of accelerating the setting time of fusion adhesives by the addition of inert inorganic powders.

TABLE 1

| Polyester | Kg of Dimethyl-terephthalate (DMT) | Kg of Dimethyl-isophthalate (DMI) | Kg of Sebacic Acid | Kg of 1,4-Butane-diol | Molar Ratio DMT/DMI/Sebacic Acid | Reduced Viscosity | Maximum Approx. Melting Temperature °C. |
|---|---|---|---|---|---|---|---|
| A | 6.98 | 1.01 | 2.1 | 9.3 | 70/10/20 | 0.83 | 170 |
| B | 5.04 | 2.09 | 2.7 | 9.0 | 52/22/26 | 0.85 | 132 |
| C | 4.18 | 2.62 | 3.03 | 9.0 | 43/27/30 | 0.84 | 110 |
| D | 3.63 | 2.97 | 3.26 | 9.0 | 37/31/32 | 0.87 | 90 |
| E | 3.61 | 3.61 | 3.79 | 10.0 | 10/10/10 | 0.83 | 70 |
| F | Composition set forth above | | | | | 0.82 | 70 |
| G | Composition set forth above | | | | | 0.85 | 140 |

| OPEN TIME (Seconds) ||||||
|---|---|---|---|---|---|
| OXIDE WAX X ||| OXIDE WAX Y |||
| 0.5 | 1.0 | 5.0 | 0.5 | 1.0 | 5.0 |
| 25 | 20 | 10 | 20 | <20 | <20 |
| 50 | 45 | 45 | 45 | 40 | 40 |
| 80 | 75 | 75 | 80 | 75 | 75 |
| 100 | 90 | 90 | 95 | 85 | 85 |
| 110 | 100 | 100 | 115 | 100 | 100 |
| 90 | 85 | 85 | 90 | 80 | 80 |
| 95 | 90 | 90 | 90 | 80 | 80 |

All amounts of oxide wax are in weight percent

| OPEN TIME (Seconds) |||  |
|---|---|---|---|
| Without Additive | With 0.5 Talcum Powder (<5 micron) | With 0.5 Silica Gel (<5 micron) | Temperature at Beginning of Measurement °C. |
| 40 | 35 | 35 | 210 |
| 105 | 100 | 100 | 172 |
| 180 | 180 | 175 | 150 |
| 220 | 215 | 210 | 130 |
| 240 | 220 | 220 | 110 |
| 180 | 175 | 180 | 110 |
| 180 | 175 | 175 | 180 |

What is claimed is:

1. A method for securing surfaces together which comprises contacting a first surface with a composition comprising a polyester and a wax, said wax present in the said composition in an amount between about 0.01 and 5 percent by weight, based on the weight of said composition in molten form, applying a second surface to said molten form of said composition, applying pressure to the surfaces till said composition sets, and recovering a material in which the surfaces are secured together.

2. A method according to claim 1 wherein said wax is present in an amount between 0.5 and 2 percent by weight, based on the weight of the composition.

3. A method according to claim 1 wherein saiad polyester has a melting point between 70° and 200°C and said wax is present in amount between 0.5 and 2 percent by weight.

4. A method according to claim 3 wherein said wax is one prepared by the Fischer-Tropsch process and has a melting point between 50° and 150°C, an acid number between 30 and 80 and a saponification number between 30 and 80 and a saponification number between 90 and 130.

5. A method according to claim 4 wherein said wax has a melting point between 50° and 100°C.

6. A method according to claim 3 wherein said wax is a microwax obtained by the deparaffination of a petroleum stock and has a melting point between 80° and 110°C., an acid number between 10 and 20 and a saponification number between 20 and 45.

7. A method according to claim 3 wherein said wax is an oxide wax comprising a microwax obtained from the deparaffination of petroleum and has a melting point between 80° and 120°C., an acid number between 10 and 20 and a saponification number between 20 and 70.

8. A method according to claim 3 wherein said wax is an oxide wax comprising an amount of soft petrolatum and has a melting point of between 40° and 70°C., an acid number between 50 and 60, and a saponification number between 100 and 115.

9. A method according to claim 3 wherein said polyester is copolymerized wth another substance having fusion adhesive properties.

10. A method according to claim 9 wherein said polyester is a co-polyester.

11. A method according to claim 10 wherein said co-polyester comprises a co-polyester prepared from monomers of dimethylterephthalate and dimethylisophthalate with an amount of sebacic acid and 1,4-butanediol.

12. A method according to claim 11 wherein the composition contains an inorganic powder selected from the group consisting of salicic acid, titanium dioxide, zirconium oxide, aluminum oxide, talcum, gypsum, fluorspar, kaolin, mica, barium sulfate, calcium carbonate and bentonite.

13. A method for securing surfaces together which comprises contacting a first surface with a composition consisting essentially of a polyester and a wax, said wax present in said composition in an amount between about 0.01 and 5 percent by weight, based on the composition, in molten form, applying a second surface to said molten form of said composition, applying pressure to the surface until said composition sets, and recovering a material in which the surfaces are secured together.

14. A method according to claim 13 wherein said polyester has a melting point between 70° and 200°C and is a polyester of a phthalic acid.

15. A method according to claim 14 wherein said polyester is a polyester with at least one aliphatic dicarboxylic acid of 6 to 36 carbon.

16. A method according to claim 15 wherein said polyester further contains a moiety of a glycol selected from the group consisting of ethylene glycol, diethylene glycol, propylene glycol, butylene glycol, a pentanediol and a hexanediol.

* * * * *

UNITED STATES PATENT OFFICE
CERTIFICATE OF CORRECTION

Patent No. 3,853,665          Dated December 10, 1974

Inventor(s) Arno Cardziella

It is certified that error appears in the above-identified patent and that said Letters Patent are hereby corrected as shown below:

Col. 1, line 47

"the large" should read -- and large --.

Col. 4, lines 3-4

"including, for example, co-polyester fusion adhesives" is omitted between the lines.

Col. 6, line 17 correct spelling of "time"

Signed and sealed this 3rd day of June 1975.

(SEAL)
Attest:

RUTH C. MASON
Attesting Officer

C. MARSHALL DANN
Commissioner of Patents
and Trademarks